T866005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

866 O.G. 22

PUBLISHED SEPTEMBER 2, 1969

689,793

FUEL OILS HAVING IMPROVED VISCOSITY AND LUBRICATING CHARACTERISTICS

Duncan M. Cameron, 354 London Road (Lambton), Sarnia, Ontario, Canada, and Stephan Ilnyckyj, 31 Taylorwood Drive (York), Islington, Ontario, Canada

Filed Dec. 12, 1967. Published Sept. 2, 1969
Int. Cl. C10l *1/16, 1/18*
U.S. Cl. 44—58
No Drawing. 10 Pages Specification

The hydrocarbon fuel base stocks to be used in preparing the compositions of this invention include the distillate fuels containing at least 95 volume percent of a liquid hydrocarbon boiling within the range between about 250° and 580° F. These fuels include aviation turbine engine fuels such as JP–1, JP–4 and JP–5 fuels, and diesel fuels such as marine, stationary and automotive diesel engine fuels. The preferred fuel oil additive of this invention is a mono-alkyl or di-alkyl benzene, more preferably the mono-alkylated benzenes and may contain from about 6 to about 30 carbon atoms. It is most preferred, however, that the additive be a mono-alkyl benzene containing from about 10 to about 20 carbon atoms in the alkyl group. The boiling range of the alkyl benzene may be within the range between about 430° and 650° F. Specific examples of alkyl and acyl substituted cyclic hydrocarbons useful herein include, 1-methyl naphthalene, 2-butyl-5-hexyl-indan, 2 - propyl - keto - 5-hexyl-indan, 2-cyclo-hexyloctane, 2,2 - dimethyl - propyl-cyclohexane, 9(2-cyclohexyl-ethyl) heptadecane, etc.